United States Patent
Welker

(10) Patent No.: US 8,534,224 B2
(45) Date of Patent: Sep. 17, 2013

(54) REMOVABLE ADAPTER TO FACILITATE MANUAL FILLING OF ANIMAL FEEDERS

(75) Inventor: Daniel R. Welker, Richmond, TX (US)

(73) Assignee: Welker Wildlife & Equipment, Inc., Sugar Land, TX (US)

( * ) Notice: Subject to any disclaimer, the term of this patent is extended or adjusted under 35 U.S.C. 154(b) by 161 days.

(21) Appl. No.: 12/939,235

(22) Filed: Nov. 4, 2010

(65) Prior Publication Data
US 2012/0111277 A1 May 10, 2012

(51) Int. Cl.
*A01K 39/01* (2006.01)
*A01K 5/00* (2006.01)

(52) U.S. Cl.
USPC ..................................... 119/51.01; 119/57.91

(58) Field of Classification Search
USPC .................. 119/51.01, 51.03, 57.91, 61.2, 65, 119/52.1, 57.1, 57.8, 57.92; 414/412, 411; 222/80, 81, 83, 83.5, 86, 88, 89, 90, 85; 141/330
IPC ............... A01K 39/00, 39/01, 39/14, 5/00, 5/01
See application file for complete search history.

(56) References Cited

U.S. PATENT DOCUMENTS

| | | | |
|---|---|---|---|
| 1,771,797 A | 7/1930 | Lewis | |
| 1,824,937 A | 9/1931 | Trouth | |
| 1,869,120 A | 7/1932 | Thoeming | |
| 2,031,869 A | 2/1936 | Trouth | |
| 2,078,599 A | 4/1937 | McCauley | |
| 2,306,426 A * | 12/1942 | Bundy | 414/412 |
| 2,796,184 A | 6/1957 | Smith | |
| 2,831,591 A | 4/1958 | Morton | |
| 3,606,057 A * | 9/1971 | June, II | 414/412 |
| 3,680,725 A | 8/1972 | Poulton | |
| 4,040,389 A * | 8/1977 | Walters | 119/52.1 |
| 4,252,489 A | 2/1981 | Mechalas | |
| 4,265,584 A * | 5/1981 | Duwell et al. | 414/412 |
| 4,307,990 A | 12/1981 | Carlsson | |
| 5,405,053 A * | 4/1995 | Zublin | 222/83.5 |
| 5,484,247 A | 1/1996 | Clark et al. | |
| 5,551,606 A * | 9/1996 | Rai et al. | 222/460 |
| 5,582,503 A * | 12/1996 | Sandoval | 414/738 |
| 5,638,988 A * | 6/1997 | Rogers et al. | 222/81 |
| 6,237,654 B1 | 5/2001 | Sheyer | |
| 6,293,318 B1 * | 9/2001 | Schmidt et al. | 141/330 |

FOREIGN PATENT DOCUMENTS

DE 3307040 A1 * 8/1984

* cited by examiner

*Primary Examiner* — Son T Nguyen
*Assistant Examiner* — Shadi Baniani
(74) *Attorney, Agent, or Firm* — Husch Blackwell LLP

(57) ABSTRACT

The removable multipurpose adapter can be used to facilitate the refilling process of large wildlife feeders. A bag of feed is dropped onto an elongate blade positioned in the adapter accomplishing two tasks almost simultaneously. First the elongate blade instantly opens the bag and the feed promptly falls from the bag if properly manipulated, without spillage. The adapter may be formed from a truncated funnel defining an inlet and an outlet. An elongate slot may be formed in the adapter to allow placement of the adapter on wildlife feeders that are raised and lowered with a wire rope which is not detached during the refilling process. The elongate blade may be offset from the center of the adapter to avoid tearing pieces of the bag which can jam the distribution assembly if allowed to fall into the feeder. The removable multipurpose adapter may be formed from a single piece or it may be formed from multiple parts.

10 Claims, 9 Drawing Sheets

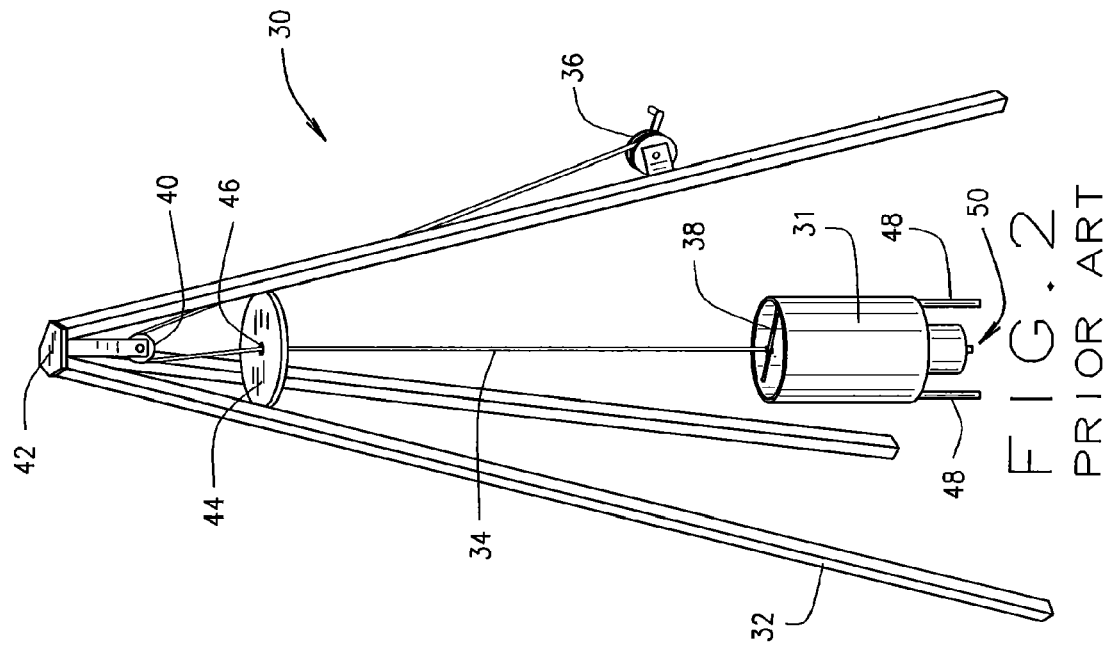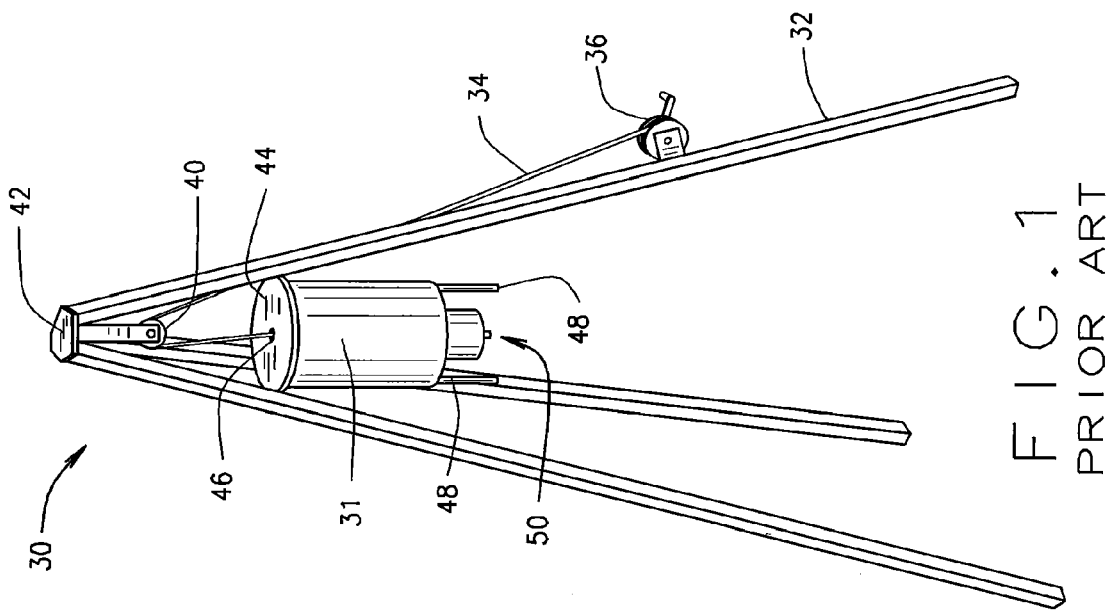

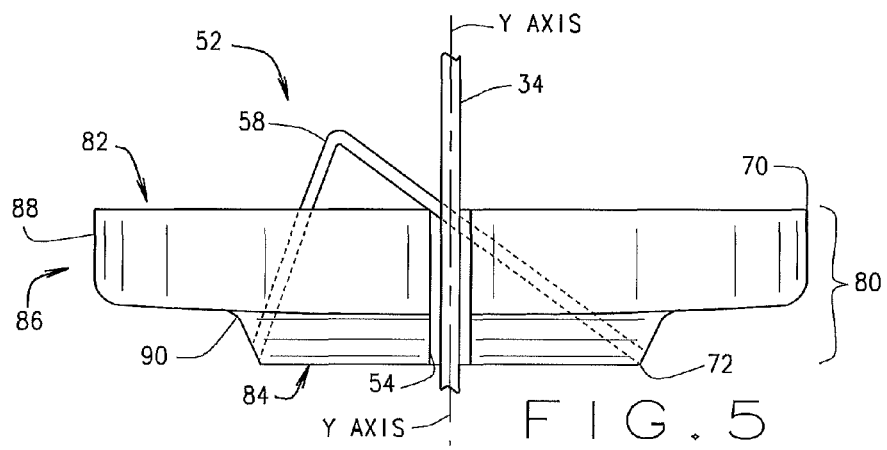
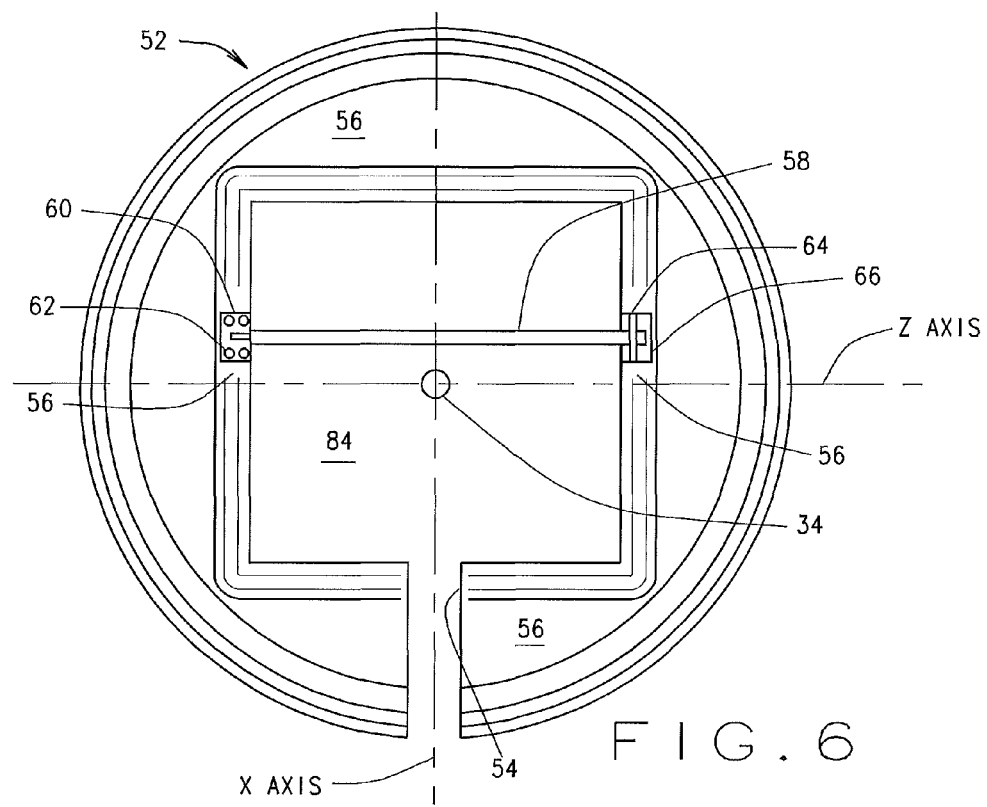

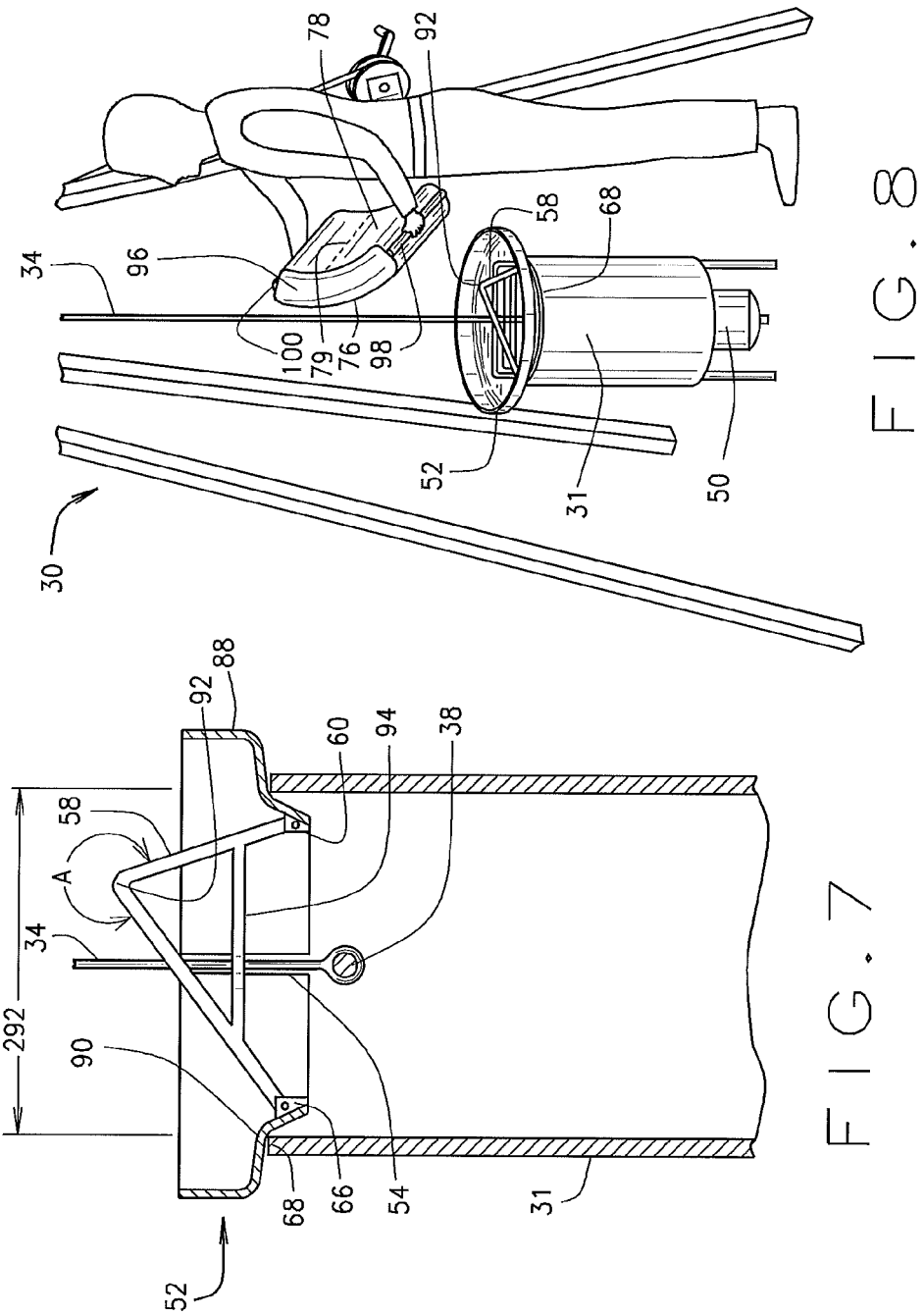

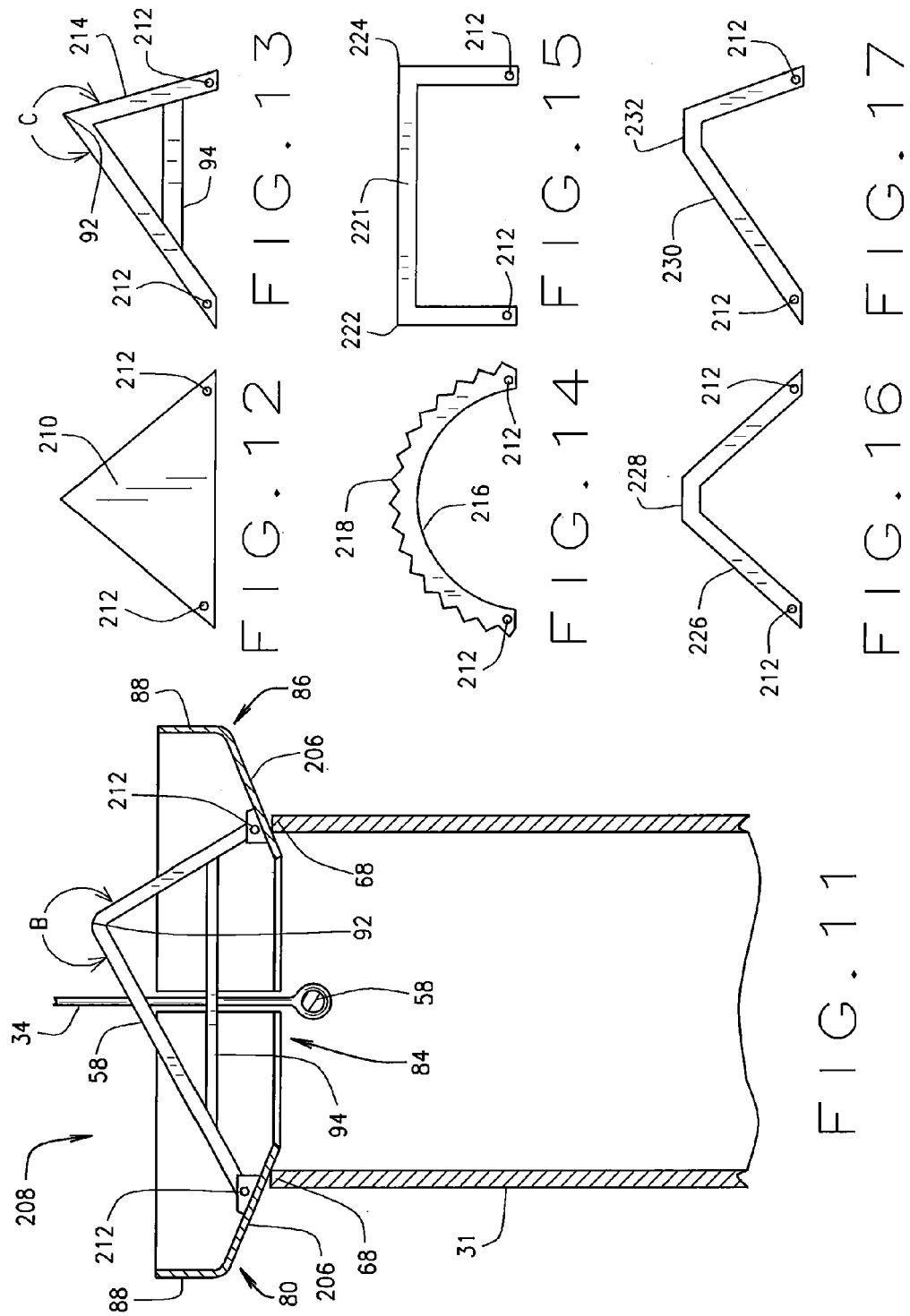

REMOVABLE ADAPTER TO FACILITATE MANUAL FILLING OF ANIMAL FEEDERS

BACKGROUND OF THE INVENTION

Birdwatchers in urban areas typically use relatively small bird feeders to attract songbirds. These small bird feeders can be easily refilled with food from a box or small bag. Birdwatchers, naturalists and outdoor enthusiasts in rural areas have the opportunity to use large feeders to attract all sorts of wildlife. These large wildlife feeders are produced in a variety of different configurations. Some barrel type feeders are suspended from a tripod by a wire rope and can be moved from an upper to a lower position during the refill cycle as shown in FIGS. 1 and 2. Some bulk type feeders are generally rectangular and because of their size and great weight, sit on the ground as shown in FIGS. 9 and 10. Some barrel type feeders have a barrel that is elevated by a tripod and the barrel is not raised or lowered to the ground during the refill cycle. These barrel type feeders that are not raised up and down for refilling are known to those skilled in the art and drawings are not included in this application.

Large feeders are generally successful and attract songbirds, animals and all sorts of wonderful wildlife. The uniform problem with these large wildlife feeders is that they run out of feed and need to be refilled which is a time consuming task, especially on a large reserve which may have as many as six or more feeders . . . . Usually these large barrel type wildlife feeders have a capacity of approximately 250 pounds of feed or more. These "barrel type feeders" are typically made from a 55 gallon barrel, hence the name. The only practical way to refill large wildlife feeders is with bags of feed that weigh about 50 pounds. Untying the bag is tedious and pouring the feed from the heavy bag into the large wildlife feeder is a difficult task, especially for retirees. Often some of the feed is spilled on the ground. The present invention is a multipurpose adapter that can be placed on large wildlife feeders to help direct the feed from a bag into the feeder. The present invention may be used with a) barrel type feeders suspended from a tripod by a wire rope, FIGS. 1 and 2, b) bulk type feeders, FIGS. 9 and 10 and c) barrel type feeders supported by a tripod, not shown, are not raised up and down by a wire rope.

U.S. Pat. No. 4,307,990 entitled "Apparatus for Empting Single or Multi-walled Packages" discloses a knife 18 in FIGS. 3, 5 and 6 for opening and emptying sacks and bags. U.S. Pat. No. 1,771,797 discloses an "Apparatus for Opening Cement Sacks and Dumping the Cement into Cement Mixers". U.S. Pat. No. 1,824,937 discloses a "Sack Severing Device". U.S. Pat. No. 1,869,120 discloses a "Dispensing Device". U.S. Pat. No. 2,031,869 discloses a "Mechanism for Splitting Containers". U.S. Pat. No. 2,078,599 discloses a "Cement Sack Opening Device". U.S. Pat. No. 2,796,184 discloses a "Bag Opener". U.S. Pat. No. 2,831,591 discloses a "Bulk Package Opener". U.S. Pat. No. 3,680,725 discloses "Bag Slitting Machines". U.S. Pat. No. 4,252,489 discloses a "Bag Opening Apparatus". U.S. Pat. No. 5,484,247 discloses a "Bag Breaker". U.S. Pat. No. 6,237,654 discloses a "Dialysis Drain Bag Drainage Device". None of these prior art devices have a multipurpose design so they can be used on both barrel type feeders and bulk type feeders.

SUMMARY OF THE INVENTION

A removable multipurpose adapter may be used to rapidly refill empty barrel type wildlife feeders and empty bulk type wildlife feeders. This adapter accomplishes two tasks almost simultaneously. First, the adapter splits open the bag and second the adapter funnels the feed into the wildlife feeder without waste. The removable multipurpose adapter is formed in the shape of a truncated funnel. The removable multipurpose adapter may be formed from a single piece or it may be formed from multiple parts.

To refill an empty wildlife feeder, the top is removed or the barrel is lowered to the ground with a wire rope. The removable multipurpose adapter is placed on the inlet of the wildlife feeder. A heavy bag of feed is dropped on the elongate blade in the adapter which causes one side of the bag to burst open. With proper manipulation of the bag, described herein, the feed will rapidly fall into the barrel. Use of the removable multipurpose adapter makes it faster to refill feeders, some of which may hold more than 1000 pounds of feed; the adapter also reduces spillage when compared with previous manual filling techniques.

The elongate blade may be an integral component of the adapter, or the elongate blade may be removable from the adapter for sharpening and/or replacement. The elongate blade may also be formed in a variety of different shapes, such as a triangle or a semi-circle. Other blade configurations are detailed herein. The removable multipurpose adapter has an inlet and an outlet. The inlet may be generally circular and the outlet may be generally square; other combinations can be achieved such as a circular inlet and a circular outlet. These various combinations are detailed herein.

The term "barrel type feeder" as used herein includes a) feeders with a wire rope as shown in FIGS. 1 and 2 and b) non-adjustable feeders that are supported by a tripod above the ground without a wire rope, not shown. Both of the aforementioned types of barrel feeders are known. To refill feeders with a wire rope the barrel may be raised and lowered from the tripod to the ground using the wire rope. To refill non-adjustable feeders supported by a tripod above the ground, the operator needs a ladder to climb up to the opening of the barrel which may be 8 feet or more above the ground. The term "bulk type feeder" as used herein refers to feeders such as those shown in FIGS. 9 and 10, which are known.

The term "truncated funnel" as used herein includes a) step designs with a taper, such as FIGS. 3-7, b) tapered designs such as FIGS. 11, 18-23 and c) step designs without any taper, such as FIGS. 24-25.

BRIEF DESCRIPTION OF THE DRAWINGS

FIG. 1 is a perspective view of a prior art barrel type feeder suspended from a tripod with a wire rope. In this view, the barrel is in the upper or raised position.

FIG. 2 is a perspective view of the same prior art barrel type feeder of FIG. 1, except the barrel is in the lowered position resting on the ground.

FIG. 5 is an elevation view of the removable multipurpose adapter rotated 90° counter-clockwise from the view in FIG. 4.

FIG. 6 is a top view of the removable multipurpose adapter of FIG. 4.

FIG. 7 is a section view of the removable multipurpose adapter of FIG. 5 rotated 180° from the view of FIG. 5.

FIG. 8 is an enlarged perspective view of the barrel type feeder in the lowered position, sitting on the ground. The removable multipurpose adapter has been slipped over the wire rope and the adapter has been placed on the rim of the barrel. An operator is holding a bag of feed and is about to drop the bag onto the elongate blade of the adapter.

FIG. 11 is a section view of an alternative embodiment of the removable multipurpose adapter sitting on the rim of a barrel.

FIG. 12 is a side view of an alternative embodiment of the elongate blade being formed from a solid equilateral triangle.

FIG. 13 is a side view of an alternative embodiment of the elongate blade being having a point formed as an acute angle.

FIG. 14 is a side view of an alternative embodiment of the elongate blade formed as a semicircle with serrations.

FIG. 15 is a side view of an alternative embodiment of the elongate blade formed with two points having right angles.

FIG. 16 is a side view of an alternative embodiment of the elongate blade formed into a V-shaped with a blunted point.

FIG. 17 is a side view of an alternative embodiment of the elongate blade formed into a V-shape with a blunted point.

DETAILED DESCRIPTION OF THE INVENTION

Figure 4:
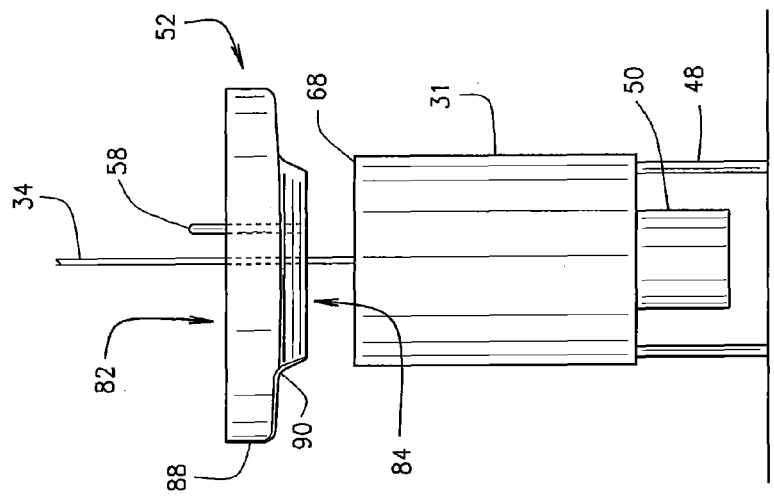
FIG. 4 is an elevation view of the barrel type feeder sitting on the ground and the removable multipurpose adapter is centered above the barrel.

Referring to FIGS. 1 and 2, a barrel type feeder 30 is suspended from a tripod 32 by a wire rope 34. The apparatus shown in FIGS. 1 and 2 is known and in common use by birdwatchers and other wildlife enthusiasts. The barrel moves from an upper or raised position as shown in FIG. 1 to a lower or lowered position as shown in FIG. 2. In FIG. 2 the barrel 31 is shown resting on the ground.

The wire rope connects on one end to a hand winch 36 and on the other end to a rod 38 secured inside a barrel 31. As previously mentioned, barrel type feeders typically have an inside diameter of approximately 22 inches and are fabricated from 55 gallon metal barrels, which are known. The wire rope passes over a pulley 40. The pulley is operatively connected to the top 42 of the tripod. A barrel lid 44 is permanently connected to the tripod legs proximate the top 42. An aperture 46 is formed in the barrel lid and the wire rope passes through this aperture. The barrel lid does not move when the barrel is raised and lowered.

The barrel has several legs 48 attached to the bottom. When the barrel is lowered, the feeder legs contact the ground and keep the barrel type feeder in an upright position. A distribution assembly 50 is attached to the bottom of the barrel and typically includes a battery, not shown, a motor, not shown, and spinner, not shown. The motor is turned on and off by an electric eye or timer, not shown, often at dawn and dusk. When the motor is on, it causes the spinner to rotate. As is well known to those skilled in the art, the spinner distributes feed by centrificial force over a wide area around the tripod. Other types of distribution assemblies are also know. The distribution assembly typically allows the operator to set the length of time the spinner rotates which effectively controls the amount of feed distributed during each cycle. The more feed that is distributed during each cycle, the more often the barrel type feeder will need to be refilled. During migrations, and during fall and winter, some outdoor enthusiasts distribute a significant amount of feed to wildlife, which means that these large feeders may need to be refilled as often as once a week, depending on wildlife density.

Referring not to FIGS. 3, 4, 5 and 6, a removable multipurpose adapter 52 may be used to open and direct feed, such as sunflower seed, shelled corn or man-made pellets from a bag, better seen in the following figures into the barrel 31. In these drawings, the size of the elongate slot 54 has been enlarged for illustrative purposes. This elongate slot is sized and arranged to allow the wire rope 34 to slip through a portion of the adapter into the open center section of the adapter. The removable multipurpose adapter is placed on to the rim 68 of the barrel 31. The open mouth of the barrel circumscribed by the rim 68 is sometimes referred to herein as the inlet of the barrel and the distribution assembly 50 may sometimes be referred to herein as the outlet of the barrel. Feed is typically sold in large paper or plastic fiber bags. Paper bags are much more common than plastic fiber bags. After the barrel type feeder is full, the adapter is removed. The adapter 52 is referred to as "removable" because it can be placed on the rim 68 of the barrel 31 to fill the empty feeder and the adapter 52 can be removed from the rim of the barrel when it has been refilled.

The removable multipurpose adapter 52 defines an inside surface 56. In one embodiment, the removable elongate blade 58 is attached to the inside surface 56 of the removable multipurpose adapter with a plurality of connectors 60 and 66. These connectors may be attached to the removable multipurpose adapter by any suitable fastener 62 such as rivets, screws, bolts or adhesive. A pin 64 passes through the second connector 66, and through the elongate blade allowing the elongate blade to be removably attached to the removable multipurpose adapter. A similar pin, not shown, connects the elongate blade to the first connector 60. In alternative embodiments, not shown, the elongate blade may be formed as an integral part of the removable multipurpose adapter.

Figure 21:
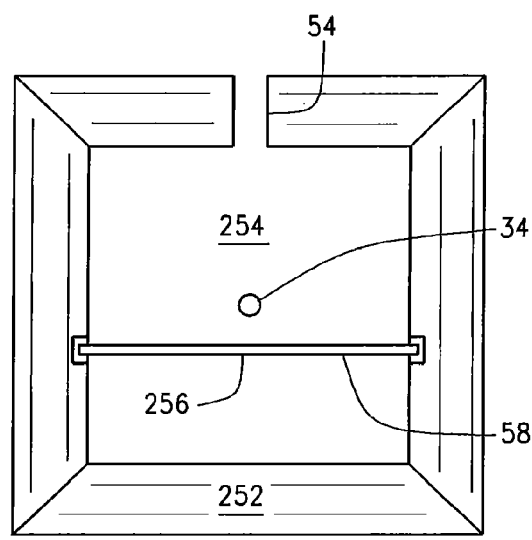
FIG. 21 is a top view of the removable multipurpose adapter of FIG. 20.
Figure 22:
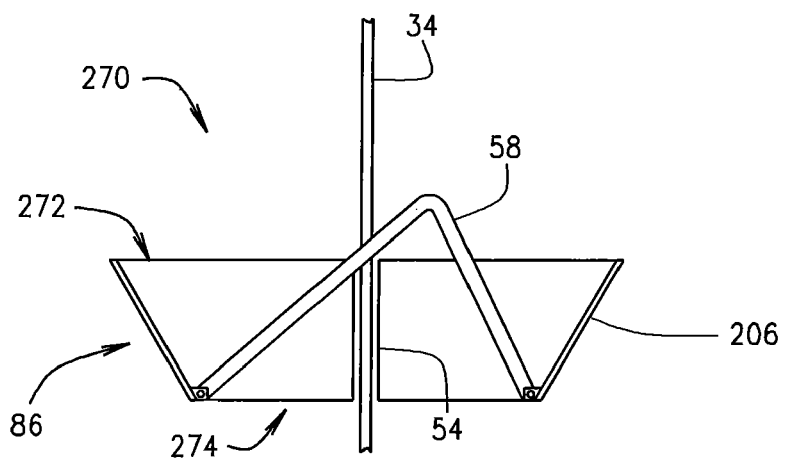
FIG. 22 is a section view of an alternative embodiment of the removable multipurpose adapter having a generally square inlet and a generally circular outlet.
Figure 23:
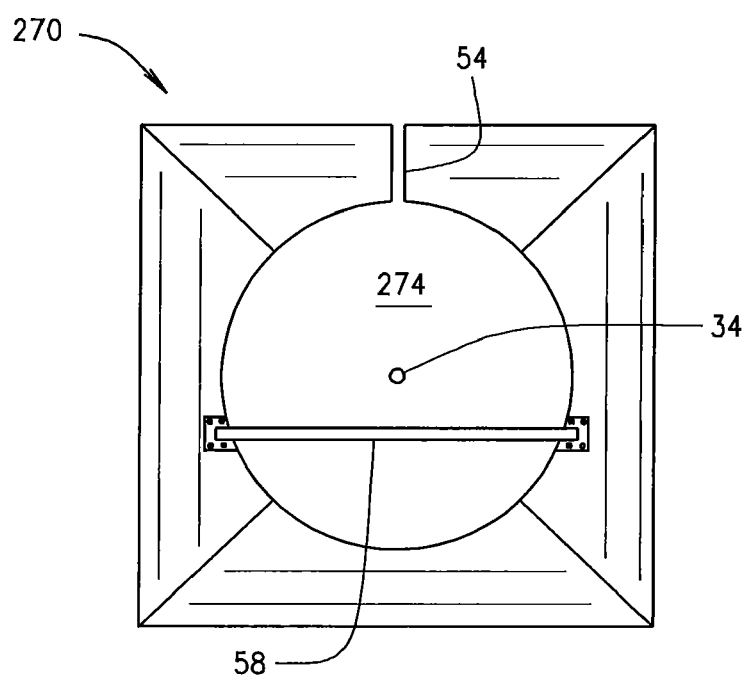
FIG. 23 is a top view of the removable multipurpose adapter of FIG. 22.

The removable multipurpose adapter may be formed into a truncated funnel 80 as shown in FIG. 5 having an upper end 70 and a lower end 72, as best seen in FIG. 5. The truncated funnel defines and inlet 82 and an outlet 84. In this embodiment, the inlet is generally circular and the outlet is generally square so the adapter may be used on both barrel type feeders such as the one shown in FIGS. 1 and 2 and bulk type feeders such as the one shown in FIGS. 9 and 10. In other embodiment, such as the one shown in FIGS. 18 and 19, both the inlet and the outlet may be generally circular. In another embodiment, such as the one shown in FIGS. 20 and 21 both the inlet and the outlet may be generally square. Other shapes and combination are within the scope of this invention including a square inlet and a circular outlet as shown in FIGS. 22 and 23. The adapter 52 is referred to as "multipurpose" because it can be used on both barrel type feeders and bulk type feeders.

A portion of the truncated funnel 80 defines an outside surface 86. A portion of the outside surface 86 forms a generally upstanding portion 88 which helps to avoid spilling the feed when it is discharged from the bag into the barrel shaped feeder, as better seen in following figures. A portion of the outside surface of the truncated funnel forms a shoulder 90 which is sized and arranged to engage the rim 68 of the barrel 31. The shoulder 90 keeps the removable multipurpose adapter from slipping off the barrel rim 68 during the filling process. Many feed bags weigh 50 pounds, so considerable forces are generated during the refilling process when these bags are dropped on the removable multipurpose adapter. If the removable multipurpose adapter slipped off the barrel rim 68 during the refilling process, feed would be spilled and the refilling process would be delayed. The feed is dispensed over time to encourage the wildlife to appear at predictable times, so birdwatchers know when to have a camera ready or when to show the grandchildren, among a host of other reasons.

In FIGS. 5 and 6, the wire rope 34 is positioned generally in the center of the adapter 52 along the Y-axis. The elongate blade 58 is offset from the wire rope opposite the elongate slot 54. This offset helps to prevent a portion of a bag 96, better seen in FIG. 8 from getting torn off and falling into the barrel type feeder along with the feed. This is particularly important with multiply paper bags. If a scrap of paper gets torn off and falls into the barrel type feeder, such scrap may fowl the distribution assembly and disrupt the flow of feed or worse yet, it may jam the distribution assembly. These problems may also cause motor burnout. Fowling and jamming are particular problems for individuals that have a rural weekend cottage and only come to the cottage on an irregular basis and to other outdoor enthusiasts that only frequent their barrel type feeders on an irregular basis. If a barrel type feeder is jammed, wildlife will move on to other areas where food is more readily available, which defeats the purpose of the feeding program. Feeding programs are designed to improve the health of wildlife and to encourage wildlife to regularly loiter in areas around the feeders where people have an opportunity to take a look. As best seen in FIG. 6, the length of the elongate non-tubular blade 58 extends parallel to the Z axis and the length of the elongate slot 54 extends parallel to the X axis. The elongate slot 54 defines a passageway through the adapter; the wire rope 34 slips through the passageway to the adapter outlet 84.

Through experimentation, the inventor has found that if the elongate blade is in contact with the wire rope, there is a chance that a piece of the bag will get pinched between the wire rope and the elongate blade, thus tearing off a portion of the bag which falls by gravity into the barrel type feeder which often results in a fowled or jammed feeder. This phenomenon is most common with multiply paper type bags. The solution to this unexpected problem is to offset the elongate blade from the wire rope when the multipurpose adapter is positioned on the rim of a barrel type feeder. Applicant believes that this offset arrangement is the best mode for general use.

FIG. 7 is an elevation view of the removable multipurpose adapter 52 rotated 180° from the view in FIG. 5. In this embodiment the elongate blade 58 forms a point 92. In this embodiment, the angle A of the point is acute. Any shape will be suitable, as long as it penetrates into the feed bag allowing the feed to fall from the bag through the removable multipurpose adapter and into the barrel 31. In this view the shoulder 90 of the truncated funnel is resting on the rim 68 of the barrel 31. In this embodiment, the elongate blade 58 includes an elongate blade brace 94, but the elongate blade brace is optional. Elongate blades with different shapes are shown below. The inside diameter 292 of the barrel 31 is about 22 inches. The outside width of the adapter 52 proximate the inlet 82 must be greater than about 22 inches so the adapter will not fall in the barrel 31 and so the adapter will properly engage the rim 68 which circumscribes the inlet of the barrel 31.

FIG. 8 is an enlarged perspective view of the barrel type feeder 30 with the barrel 31 in the lowered position, sitting on the ground. The removable multipurpose adapter 52 has been slipped over the wire rope 34 and the adapter has been placed on the rim 68 of the barrel. The removable multipurpose adapter is held in place by gravity. An operator is holding a bag 96 of feed and is about to drop the bag onto the point 92 of the elongate blade 58. The left hand of the operator has grasped the first end 98 of the bag and the right hand of the operator has grasped the opposing end of the bag 100. The bag weighs about 50 pounds and will bend of its own weight when picked up as shown in the figure. The point 92 of the elongate blade points towards the operator. Of course, the bag may be held in different ways when being placed in the removable multipurpose adapter, but the method described above seems to be the quickest way to refill a feeder.

The bag has a first generally flat side 76 facing the elongate blade and an opposing generally flat side 78 facing the operator. When the generally flat side 76 of the bag 96 hits the blade, the flat side 76 is pierced by the elongate blade. The opposing generally flat side 78 of the bag is not cut or pierced by the elongate blade. After dropping the bag onto the elongate blade, the operator bends the two ends of the bag 98 and 100 together using the paper hinge identified by the dashed line 79. As the two halves of the bag are bent back against each other, the feed rapidly falls from the bag, through the adapter and into the barrel. Bringing the ends of the bag together in an arc allows gravity to rapidly pull the grain from each half of the bag. When the ends of the bag are not brought together properly, discharge is slower. But when properly done, the entire bag can be opened and emptied in several seconds which is much faster than the old manual open and pour process. On a game preserve that is managed for wildlife with approximately 5 large barrel feeders and approximately 3 bulk type feeders, approximately 7000 pounds of feed are needed to refill all the feeders. Assuming that the bags have been delivered to the game preserve, use of the present invention can reduce the time needed to refill all of these feeders from 2 days using the old manual open and pour method to about 1 day using the present invention.

Figure 9:
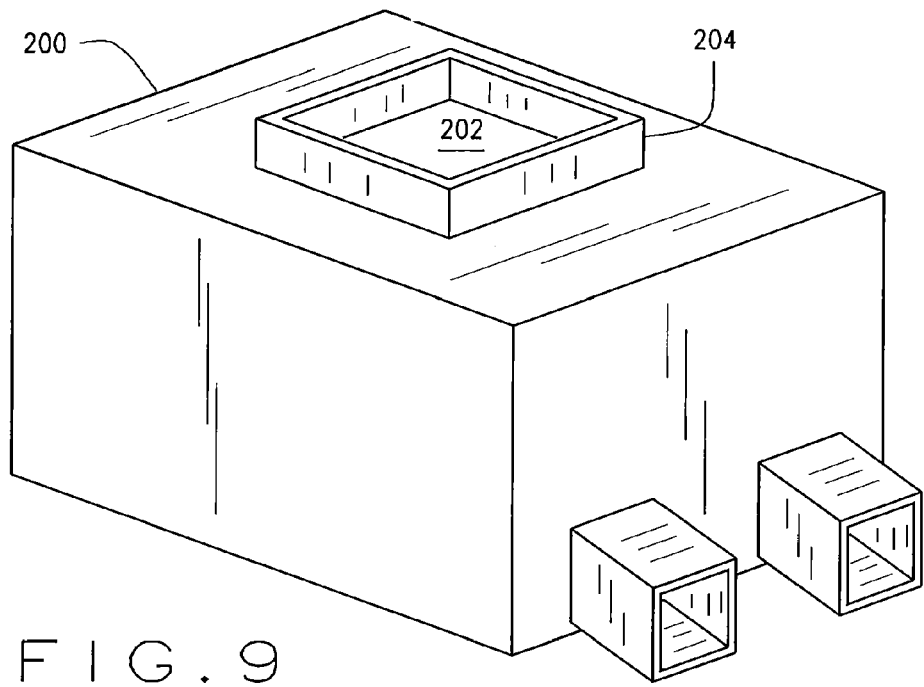
FIG. 9 is a perspective view of a prior art bulk type feeder having a generally square inlet with the cap removed.
Figure 10:
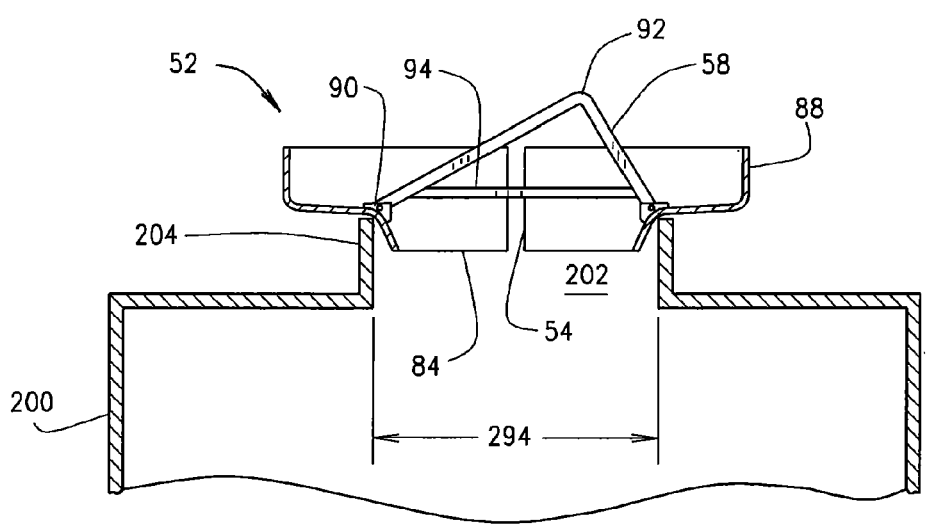
FIG. 10 is a section view of the bulk type feeder of FIG. 9 and the removable multipurpose adapter is in place on top of the generally square inlet.

FIG. 9 is a perspective view of a bulk type feeder 200. The bulk type feeder has an inlet 202 which is often surrounded by an upstanding lip 204. Bulk type feeders are known. FIG. 10 is a section view of the bulk type feeder 200 with a removable multipurpose adapter 52 sitting on the upstanding lip 204 of the bulk type feeder. The outlet 84 of the removable multipurpose adapter 52 is generally square in shape and is sized and arranged to fit inside the inlet 202 of the bulk type feeders. An outside width 294 of the truncated funnel proximate the outlet 84 must be less than about 19 inches per side so the outlet 84 will fit into upstanding lip 204 of the bulk type feeder and properly engage the inlet 202 of the bulk type feeder.

FIG. 11 is a section view of an alternative embodiment 208 of the removable multipurpose adapter sitting on the rim 68 of the barrel 31. The outside surface 86 forms a taper 206 extending from the outlet 84 to the upstanding portion 88 of the adapter. This alternative embodiment does not have the shoulder 90 shown in FIG. 7. Because this alternative embodiment 208 of the removable multipurpose adapter lacks a shoulder, it is more prone to slip around on the rim 68 of the barrel type feeder, during the filling process. This slippage is undesirable because it can lead to spillage of the feed. The point 92 of the elongate blade 58 forms a right angle B.

FIG. 12 is a side view of an alternative embodiment 210 of the elongate blade being formed from a solid equilateral triangle. The elongate blade in this figure may include apertures 212 to facilitate attachment or removal for sharpening and/or replacement of the elongate blade.

FIG. 13 is a side view of an alternative embodiment 214 of the elongate blade. The angle C of the point 92 of the elongate blade is an acute angle. The elongate blade in this figure may include apertures 212 to facilitate removal for sharpening and/or replacement of the elongate blade. The alternative blade designs shown in this and the following figures may include a brace 94 as an optional component.

FIG. 14 is a side view of an alternative embodiment 216 of the elongate blade formed as a semicircle with serrations 218. The elongate blade in this figure may include apertures 212 to facilitate attachment or removal for sharpening and/or replacement of the elongate blade.

FIG. 15 is a side view of an alternative embodiment 221 of the elongate blade formed with two points, 222 and 224. These points are formed as right angles. The elongate blade in this figure may include apertures 212 to facilitate attachment or removal for sharpening and/or replacement of the elongate blade.

FIG. 16 is a side view of an alternative embodiment 226 of the elongate blade formed in a general V-shaped design a blunted point 228. The elongate blade in this figure may include apertures 212 to facilitate attachment or removal for sharpening and/or replacement of the elongate blade.

FIG. 17 is a side view of an alternative embodiment 230 of the elongate blade formed in a general V-shaped design with a blunted point 232. The elongate blade in this figure may include apertures 212 to facilitate attachment or removal for sharpening and/or replacement of the elongate blade.

Figure 18:
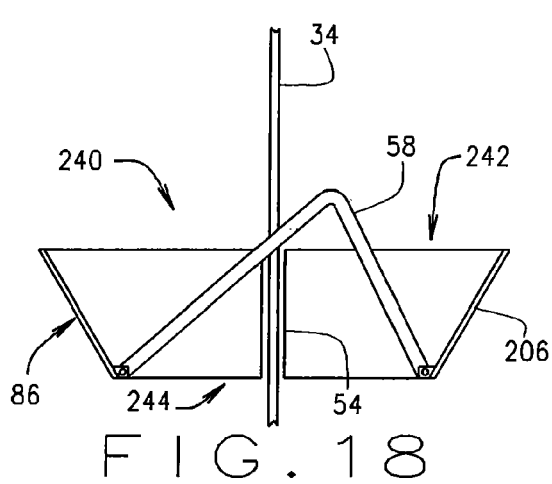
FIG. 18 is a section view of an alternative embodiment of the removable multipurpose adapter having a generally circular inlet and a generally circular outlet.
Figure 19:
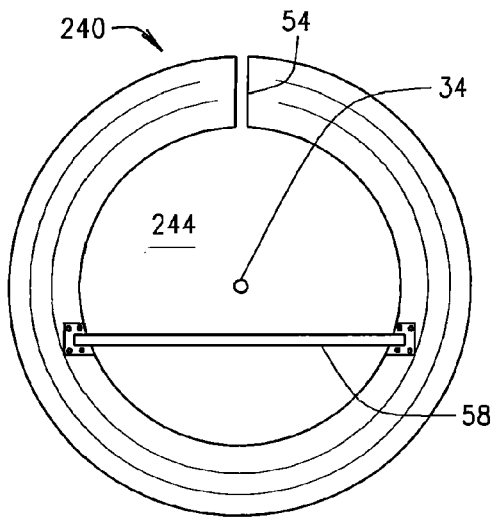
FIG. 19 is a top view of the alternative embodiment of the removable multipurpose adapter of FIG. 18.

FIG. 18 is a section view of an alternative embodiment 240 of the removable multipurpose adapter having a generally circular inlet 242 and a generally circular outlet 244. FIG. 19 is a top view of the alternative embodiment of FIG. 18, with both the inlet and outlet having a generally circular shape. Again the elongate blade 58 is offset from the center of the circular outlet 214 to prevent jams. The wire rope 34 does not contact the elongate blade. Any of the alternative blades shown in the preceding figures may also be useful in this alternative embodiment. The outside surface 86 of the adapter funnel forms a taper 206 without the shoulder 90 shown in FIG. 7.

Figure 20:
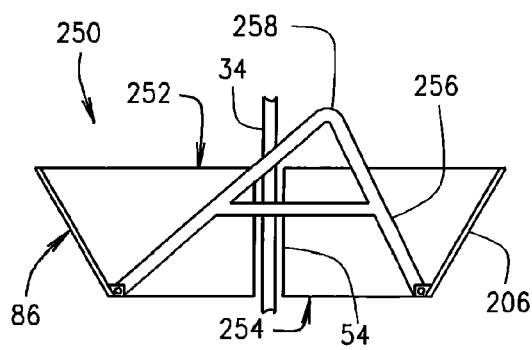
FIG. 20 is a section view of an alternative embodiment of the removable multipurpose adapter having a generally square inlet and a generally square outlet.

FIG. 20 is a section view of an alternative embodiment 250 of the removable multipurpose adapter having a generally square inlet 252 and a generally square outlet 254. An elongate blade 256 may be removable from the removable multipurpose adapter 250 as shown in this figure or the elongate blade and adapter may be formed as a single piece design. The elongate blade forms a point 258. Any of the alternative blades shown in the preceding figures may also be useful in this alternative embodiment. The outside surface 86 of the truncated funnel forms a taper 206, without the shoulder 90 shown in FIG. 7. FIG. 21 is a top view of the removable multipurpose adapter of FIG. 20. The alternative embodiment of FIGS. 20 and 21 may be used to help fill a) the hoppers of seed drills and other types of agricultural seed planters and b barrel type feeders and c) bulk type feeders.

FIG. 22 is a section view of an alternative embodiment 270 of the removable multipurpose adapter having a generally square inlet 272 and a generally circular outlet 274. The wire rope 34 slips through the elongate slot 54 and is positioned in the center of the adapter, but offset from the elongate blade 58. The outside surface 86 of the adapter 270 forms a taper 206 without the shoulder 90 shown in FIG. 7. FIG. 23 is a top view of the alternative embodiment 270 of the removable multipurpose adapter of FIG. 22. The wire rope 34 is centered in the circular outlet 274 and the elongate blade 58 is offset from the wire rope to prevent pinching the bag and tearing off a piece which may jam the distribution assembly, better seen in FIGS. 1 and 2.

Figure 24:
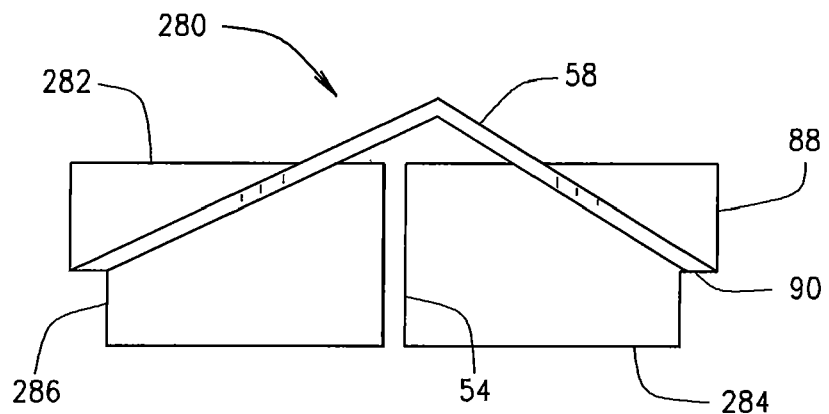
FIG. 24 is a side view of an alternative design of the removable multipurpose adapter with a vertical band surrounding the outlet.

FIG. 24 is a section view of an alternative embodiment 280 of the removable multipurpose adapter having a generally circular inlet 282 and a generally circular outlet 284. A vertical band 286 extends from the shoulder 90 towards the generally circular outlet 284. This vertical band may be used in any embodiment of the removable multipurpose adapter.

As previously mentioned, the metal 55 gallon barrel has an inside diameter of about 22 inches as better seen in FIG. 7. Therefore the outside diameter (outside width) of the generally circular inlet 282 in FIG. 24 needs to be in excess of about 22 inches wide in order to avoid falling into the inlet of the barrel as shown in FIG. 2 and to properly engage the rim 68 of the barrel 31. Likewise, the circular inlet of all the removable multipurpose adapters described in this application must have an outside diameter (outside width) in excess of about 22 inches. All removable multipurpose adapters described in this application with a square inlet must have an outside width in excess of about 22 inches in order to avoid falling into the inlet of a barrel and to properly engage the rim 68 which circumscribes the inlet.

Sweeney® bulk type feeders have a generally square inlet opening that is about 19 inches by about 19 inches. In order for the outlet of the removable multipurpose adapter to fit inside the inlet opening of a Sweeney® brand bulk feeder the outside diameter (outside width) 294 of the circular outlet 284 must be less than about 19 inches and the outside width of a square outlet must also be less than the size of the 19 inch square inlet.

Figure 25:
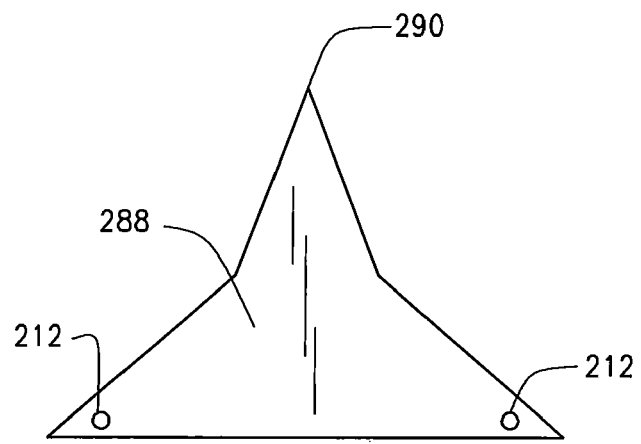
FIG. 25 is side view of an alternative embodiment of the elongate blade.

FIG. 25 is a side view for an alternative design for the blade 288. The blade 288 has a point 290 formed with an acute angle and a narrow projection from the body of the blade. This particular design may be especially useful with fiber type bags. The elongate blade in this figure may include apertures 212 to facilitate attachment or removal for sharpening and/or replacement of the elongate blade.

Method of Operation

Barrel Type Feeders 30 with a Wire Rope 34.

Figure 3:
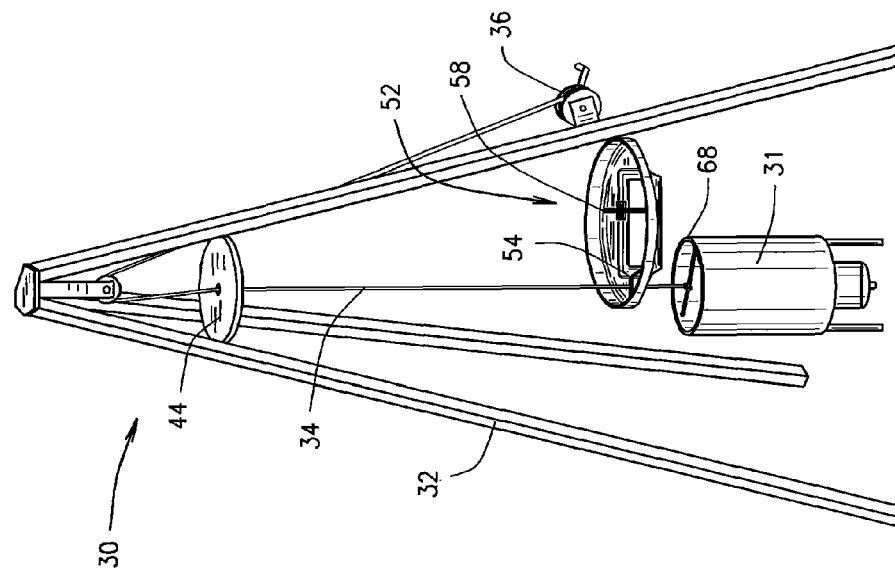
FIG. 3 is a perspective of the same barrel type feeder of FIG. 2 with the barrel resting on the ground. In this view, the removable multipurpose adapter has been partially slipped over the wire rope.

Assume that an empty barrel 31 is in the raised position as shown in FIG. 1. First, the operator lowers the empty barrel using the manual winch from the raised position of FIG. 1 to the lowered position of FIG. 2. The legs of the barrel 31 touch the ground and maintain the barrel in a generally upright position. The inlet of the barrel type feeder is open, because the top of the feeder is permanently attached to the top of the tripod and does not move up and down when the winch is actuated. The operator positions the elongate slot of the multipurpose adapter in alignment with the wire rope as shown in FIG. 3 and slides the adapter over the barrel so the wire rope is positioned generally in the center of the adapter as shown in FIG. 4. The operator then lowers the removable multipurpose adapter 52 on to the rim 68 of the barrel 31 as shown in FIG. 7. The removable multipurpose adapter is now in place as better seen in FIG. 8 with the point of the elongate blade angled towards the operator and away from the wire rope. As an option, the operator may actuate the winch again to put some slack in the wire rope allowing the wire rope to be pushed further away from the center of the adapter and away from the point of the blade.

In the past, it was necessary for the operator to cut or rip open each individual bag of feed and manually pour the feed into the open mouth of the barrel. Opening the bag was tedious at best. Lifting an open 50 pound sack of feed and tipping it over into the open mouth of the barrel was strenuous. A quick pour of the feed into the barrel often led to spillage and a slow pour to reduce spillage was time consuming.

In contrast, the present invention is fast and avoids spills. As shown in FIG. 8, the operator grabs a bag of feed 96 by the ends 98 and 100 and positions the bag over the elongate blade. Then, the bag of feed is dropped onto the elongate blade of the adapter accomplishing two tasks almost simultaneously. First, the bag is opened, and second the feed is discharged. The elongate blade causes one side 76 of the heavy bag of feed to burst open in an instant. The opposing side 78 of the bag is not damaged by the blade. Then the flat side of the bag 78 is folded back upon itself as described below in greater detail.

After the bag hits the elongate blade, the bag must be rapidly folded together to promptly empty the feed from the bag. Using the elongate blade as a center, and the distance from the elongate blade to the end 98 of the bag as a radius, the operator uses his left hand to sweep the end of the bag 98 in a curving motion from about nine o'clock to about 12 o'clock over the blade at the height of one radius. At the same time, the operator uses his right hand to sweep the end of bag 100 in a curving motion from about 3 o'clock to about 12 o'clock over the blade at the height of one radius, thus bending the two halves of the bag together using the paper hinge 79. When the bag is properly bent together substantially all of the feed will rapidly fall through the adapter into the barrel type feeder in several seconds which is much faster than the old manual techniques. Several bags of feed are typically needed to completely refill and empty barrel type feeder with a wire rope. When the barrel is full, the adapter is removed from the barrel type feeder. The operator then actuates the winch, causing the barrel to move upward and into contact with the stationary lid, which keeps out water and varmints.

Barrel Type Feeders without a Wire Rope, not Shown

Other barrel type feeders have a tripod that supports a barrel with the distribution assembly about head high. These barrel type feeders that do not have a wire rope to raise and lower the barrel are even more trouble to refill. The barrel is mounted at the top of a tripod, not shown. These barrels have a conventional top, not shown which is secured to the barrel with a conventional barrel band, not shown. To refill these feeders, the operator needs to carry a ladder or stand on the back of a truck to lift the heavy feed bags up to the height of the open mouth of the barrel which is sometimes 8 feet or higher off the ground. A lot of spillage typically occurs when refilling these barrel type feeders because they are high off the ground.

To refill one of these barrel type feeders, the conventional top, not shown, must first be removed. The removable multipurpose adapter if placed on the rim of the open barrel. Using the present invention, the bag does not need to be manually untied. A bag of feed is dropped onto the elongate blade accomplishing two tasks almost simultaneously. One side of the bag bursts open in an instant and when properly manipulated as described above empties in several seconds.

Several bags of feed are usually needed to refill these types of feeders. After the adapter is removed, the conventional top, not shown, is replaced and the barrel band, not shown, is put back on to secure the top to the barrel. The feeder is now ready to operate.

Bulk Type Feeders 200

Bulk type wildlife feeders are shown in FIGS. 9 and 10. These bulk type wildlife feeders typically hold from about 500 pounds up to about 2000 pounds of feed. These bulk type feeders are generally placed on the ground because of their great size and weight. An inlet to the bulk type wildlife feeder is covered by a removable top, not shown. These inlets are typically square. To refill or top off one of these bulk type wildlife feeders, the first thing to do is remove the top from the inlet of the bulk type feeder. Then the removable multipurpose adapter is placed in or on the inlet of the bulk type feeder. A bag of feed is dropped onto the elongate blade accomplishing two tasks almost simultaneously. First, one side of the bag bursts open. Second, the feed rapidly empties from the bag in several seconds, using proper techniques described above.

Once the feeder has been refilled, the adapter is removed from the bulk type feeder and the top is replaced on the inlet of the bulk type feeder. This wildlife feeder has now been refilled or topped off and is ready to go back into operation.

Seed Drills and Other Agricultural Seed Planters

The first step in raising corn or any other crop is to plant the seed in the ground. At home in the garden, planting seed is done by hand. On modern farms, planting is done by a machine commonly known as a seed drill or seed planter, not shown. These agricultural implements are known. These agricultural implements typically have multiple hoppers to hold the seed allowing the implement to plant multiple rows at a time. On a farm, and elsewhere, time is money. In the past every bag of seed needed to be manually opened and then manually dumped into each hopper. The cost of seed for the new crop is very high compared to the feeds discussed above. Anything that can be done to minimize spillage saves money and anything that speeds up the process saves even more money. One embodiment of the present invention, shown in FIGS. 20 and 21 is sized and arranged to engage seed hoppers. Each hopper has a top to protect the valuable seed.

To refill each hopper, the top must first be removed. Then one embodiment of the present invention is placed on the hopper. A bag of seed is dropped onto the elongate blade accomplishing two tasks almost simultaneously. First, the bag one side of the bag bursts open. Second, the feed rapidly empties from the bag in several seconds, using proper techniques described above.

After each hopper has been refilled or topped off, the adapter is removed. Then the tops, not shown, need to be placed back on each hopper. The seed drill is then ready to be used in the field.

The invention claimed is:

1. A removable multipurpose adapter to facilitate manual filling of an animal feeder using at least one bag of feed weighing about 50 pounds, the adapter being suitable for use with a barrel type animal feeder and a bulk type animal feeder, the adapter comprising:

a truncated funnel defining an adapter inlet and an adapter outlet, the adapter outlet sized and arranged to engage the animal feeder inlet of both a barrel type and a bulk type animal feeder;

an elongate slot formed in the truncated funnel, the elongate slot defining a passageway through an upstanding portion of the adapter and through the truncated funnel to the adapter outlet, the elongate slot sized and arranged to allow a wire rope to pass through the slot to the adapter outlet to facilitate placement of the removable multipurpose adapter on the upper rim of a barrel type animal feeder which is raised and lowered by the wire rope;

an elongate non-tubular blade arising from an inside surface of the truncated funnel, the elongate non-tubular blade arranged to puncture each bag of feed placed on the elongate non-tubular blade by an individual to allow the feed to discharge from the bag, through the adapter and into the barrel type animal feeder and a bulk type animal feeder; and at least a portion of a length of the elongate slot extends generally parallel to the X axis of the adapter and a length of the elongate non-tubular blade extends generally parallel to the Z axis of the adapter.

2. The adapter of claim 1 wherein an outside surface of the truncated funnel proximate the adapter outlet is sized and arranged to engage an upper rim of a barrel type animal feeder and the outside surface of the truncated funnel proximate the adapter outlet is sized and arranged to engage an inlet of a bulk type animal feeder.

3. The adapter of claim 2 wherein the inlet is formed from an upstanding circular portion of the truncated funnel and the outlet is defined by a square opening in the bottom of the truncated funnel.

4. The adapter of claim 3 wherein the elongate blade is offset from the Y-axis of the adapter and wherein the elongate blade forms a point which is oriented towards an operator to facilitate instant splitting of the bag of feed and rapid discharge of the feed from the bag through the adapter and into the animal feeder.

5. The adapter of claim 4 wherein the upstanding portion of the truncated funnel is connected to a shoulder sized and arranged to fit on an upper rim of the barrel shaped animal feeder.

6. The adapter of claim 5 wherein the elongate blade is removable from the multipurpose adapter.

7. The adapter of claim 4 wherein the elongate blade forms a point which forms an acute angle.

8. A removable multipurpose adapter to facilitate manual filling of both barrel type and bulk type animal feeders using at least one bag of feed, the adapter comprising:

a truncated funnel defining an adapter inlet and an adapter outlet, the adapter outlet having a lip connected to a shoulder which is sized and arranged to sit on an upper circular rim of a barrel shaped animal feeder;

an outside surface of the truncated funnel sized and arranged to engage an inlet of a bulk animal feeder;

an elongate slot formed in the truncated funnel, the elongate slot defining an elongate passageway through an upstanding portion of the adapter through the truncated funnel to the adapter outlet, the elongate slot sized and arranged to allow a wire rope to pass through the truncated funnel to the adapter outlet so the shoulder may sit on the upper circular rim of the barrel shaped animal feeder;

an elongate non-tubular blade arising from an inside surface of the truncated funnel and offset from the center of the adapter, the elongate non-tubular blade forming a point oriented towards an operator to open each bag of feed placed on the adapter so the feed will discharge from the bag, through the square outlet into the animal feeder and at least a portion of a length of the elongate slot extends generally parallel to the X axis of the adapter and a length of the elongate non-tubular blade extends generally parallel to the Z axis of the adapter.

9. A removable multipurpose adapter to facilitate manual filling of both barrel type and bulk type animal feeders using at least one bag of feed, the adapter comprising:

a generally circular upright lip having a circumference larger than the circumference of an upper rim of a barrel shaped animal feeder;

a truncated funnel connected to the upright lip, the truncated funnel defining a taper which forms an outlet sized and arranged to engage an upper lip of a bulk animal feeder;

an elongate slot formed through the generally circular upright lip and truncated funnel, the elongate slot defining a passageway through the generally circular upright lip of the adapter and through the truncated funnel, the elongate slot sized and arranged to allow a wire rope to pass through the generally circular upright lip and truncated funnel to the adapter outlet so the truncated funnel can sit on the upper circular rim of the barrel shaped animal feeder;

an elongate non-tubular blade attached to an inside surface of the removable multipurpose adapter, the elongate non-tubular blade arranged to pierce each bag of feed placed on the point of the elongate non-tubular blade which allows the feed to fall from the bag through the adapter outlet, and at least a portion of a length of the elongate slot extends generally parallel to the X axis of the adapter and a length of the elongate non-tubular blade extends generally parallel to the Z axis of the adapter.

10. A removable multipurpose adapter to facilitate manual filling of both barrel type and bulk type animal feeders using at least one bag of feed, the adapter comprising:

a truncated funnel defining an adapter inlet and an adapter outlet;

an outside width of the truncated funnel proximate the inlet is wider than about 22 inches to allow the truncated funnel to engage the rim of a barrel type feeder;

an outside width of the truncated funnel proximate the outlet is narrower than about 19 inches to allow the truncated funnel to engage the inlet of a bulk type feeder;

an elongate slot formed in the truncated funnel, the elongate slot defining an opening through an upstanding portion of the adapter through the truncated funnel to the adapter outlet, the elongate slot sized and arranged to allow a wire rope to pass through the truncated funnel to the adapter outlet;

an elongate non-tubular blade arising from an inside surface of the truncated funnel and offset from the center of the adapter, the elongate non-tubular blade forming a point oriented towards an operator to open each bag of feed placed on the adapter allowing the feed to discharge from the bag, through the adapter outlet into both the barrel type and the bulk type animal feeders and at least a portion of a length of the elongate slot extends generally parallel to the X axis of the adapter and a length of the elongate non-tubular blade extends generally parallel to the Z axis of the adapter.

\* \* \* \* \*